Patented Jan. 18, 1944

2,339,387

UNITED STATES PATENT OFFICE 2,339,387

PLASTICIZED VINYL POLYMER

Rudolf Endres, Dessau-Rosslau, Germany; vested in the Alien Property Custodian

No Drawing. Application August 15, 1939, Serial No. 290,189. In Germany August 15, 1938

2 Claims. (Cl. 260—36)

It has been found that the esters from polybasic aliphatic or cycloaliphatic carboxylic acids not interrupted by other atoms are excellent dissolving, swelling and gelatinizing agents for polymerisation-products of many a kind obtainable by the polymerisation of compounds containing at least once the group $CH_2=C=$.

Among the compounds containing the aforementioned group there may be cited e. g.: vinylalcohol, vinyl ester such as vinyl-chloride where the poly-vinyl-chloride may be re-halogenated, vinyl-acetate, vinyl-chloroacetate, vinyl-alkyl ether, vinyl-thio-ether, vinyl-amine, vinyl-acetylene, divinyl-acetylene, vinyl-alkyl-ketone, acryl-acid, acryl-acid ester, methyl-acryl-acid, methacryl-acid ester, vinyl-acetic acid, styrol, butadiene, isoprene, isobutylene and the like.

As poly-basic aliphatic or cycloaliphatic carboxylic acids respectively apt for the esters suggested according to the present invention there may be mentioned e. g. adipic acid, methyl adipic acid, dimethyl adipic acid, sebacic acid, hexahydrophthalic acid, hexahydrophenylene-diacetic acid, octohydrocinnamic-o-carboxylic acid and the like. Those carboxylic acids are, according to the present invention, esterified in a way known and usual in itself with alcohols of the aliphatic, cycloaliphatic or aromatic series or with mixtures of same. Among them there are e. g.: mono- or polyvalent, saturated or non-saturated, substituted or non-substituted aliphatic alcohols such as amyl-alcohol, pentandiol, hexyl-alcohol, hexandiol, octyl-alcohol, decyl-alcohol, decandiol, dodecyl-alcohol, tetradecyl-alcohol, hexadecyl-alcohol, octadecyl-alcohol, octadecenyl-alcohol, chloro-octadecyl-alcohol, octadecandiol, montanyl-alcohol etc., naphthenic-alcohols, cyclohexanols, decalinols, furthermore benzyl-alcohol, β-phenylethyl-alcohol, furfuryl- and tetrahydro-furfuryl-alcohol and the like. For the esterification those alcohols may likewise be mixed with one another.

As suitable esters corresponding to the present invention there may be cited: adipic acid-dioctyl ester, adipic acid-didodecyl ester, adipic acid-dicyclohexyl ester, adipic acid-didecyl ester, adipic acid-1,5-pentandiol-di-ester, adipic acid-ditetrahydrofurfuryl ester, sebacic acid-dioctyl ester, hexahydro-phenylene-diacetic acid-dihexyl ester, hexahydrophenylene-diacetic acid-dicyclohexyl ester, sebacic acid-dimethylcyclohexyl ester and the like. The compounds of this paragraph are referred to hereinafter as di-esters of saturated aliphatic and cycloaliphatic dicarboxylic acids with saturated aliphatic and cyclic alcohols of 5 to 12 carbon atoms.

The aforesaid softening agents and the like allow of being easily incorporated in polymerisation-products. They may also easily be united with other stuffs, so that in co-employing those softening agents obtained from the polymerisation-products we are in a position to make mixed products e. g. with cellulose-derivatives, natural resins, natural caoutchouc, albuminous artificial masses, other artificial resins and the like.

Example 1

100 weight-parts of a mixed polymerisate of vinyl-acetate and vinyl-chloride (1:1) are homogenized on the roller with 20 weight-parts of adipic acid-dioctyl ester and 5 weight-parts of adipic acid-didodecyl-ester at about 80° C. This mass may be pressed in the usual way and it supplies a product of a very good elasticity and of excellent electrical properties.

Example 2

15 weight-parts of a mixed polymerisate of vinyl-acetate and vinyl-chloride (1:3) are dissolved in a solvents-mixture of 80 weight-parts of ethyl-acetate, 60 of xylol and 45 of acetone, and into this solution 10 weight-parts of adipic acid-di-tetrahydrofurfuryl ester or, respectively, hexa-hydrophenylene-diacetic acid-di-cyclohexyl ester are stirred in. This solution supplies, after drying, a very elastic and clear film, which is also suitable for the impregnating of textiles, paper, leather etc.

Example 3

100 weight-parts of a mixed polymerisation product of vinyl-chloride and vinyl-acetate (1:1) are mixed in a kneader at a temperature of 80° C. with 25 weight-parts of adipic acid-didecyl ester. The obtained mass is then formed into pieces by pressing. The pieces possess excellent electrical isolating properties and have a good cold test.

I claim:

1. A plastic composition containing a mixed polymerizate of vinyl-acetate and vinyl-chloride and a mixture of adipic acid dioctyl ester and adipic acid didodecyl ester.

2. An electrical insulating plastic composition containing a mixed polymerizate of vinyl-acetate and vinyl-chloride, obtained by polymerizing said vinyl compounds in the approximate molar ratio of 1:1, and a dialkyl ester of adipic acid as a plasticizing agent, said alkyl group containing from 8 to 12 carbon atoms, the ratio of said polymerizate to said plasticizer being approximately 4:1.

RUDOLF ENDRES.